E. F. SIEBERT.
COFFEE POT.
APPLICATION FILED JUNE 5, 1913.
1,115,872.
Patented Nov. 3, 1914.
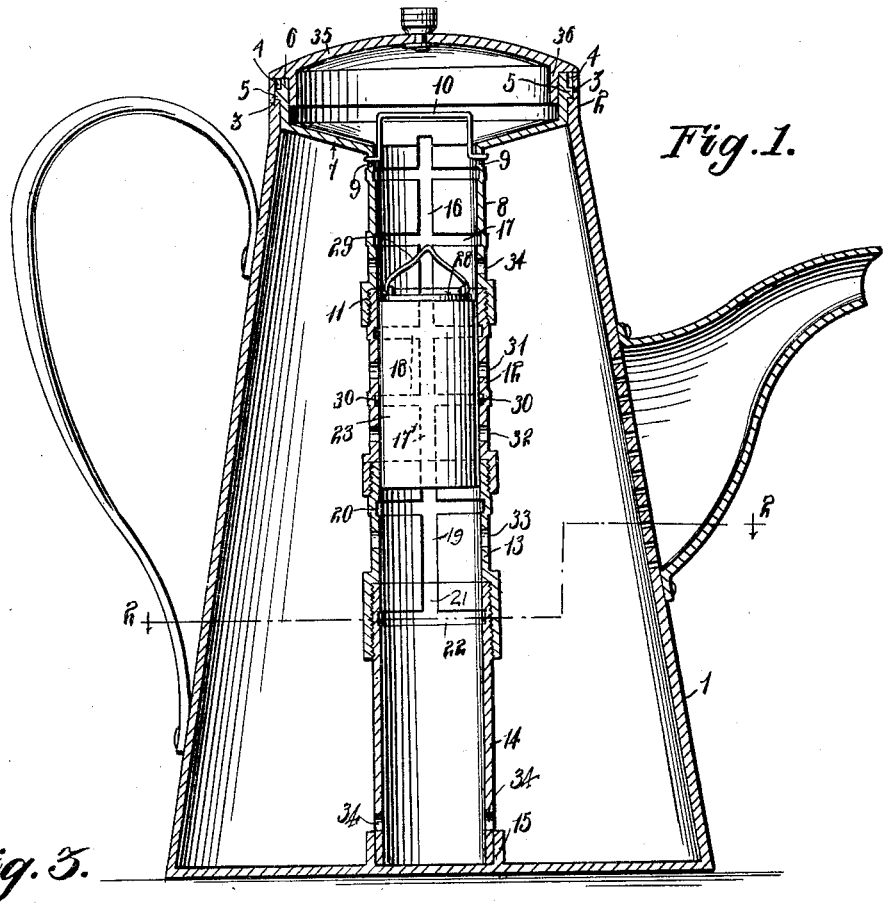
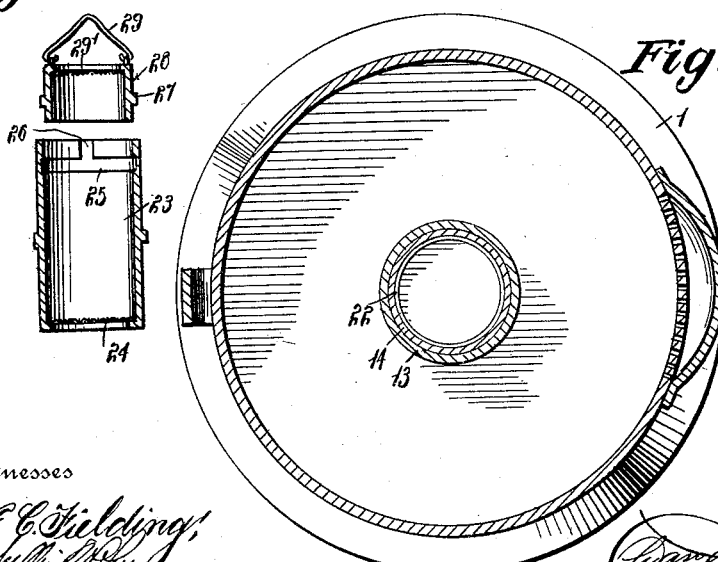
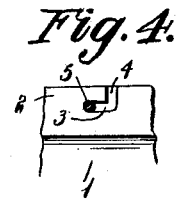
Witnesses
W. C. Fielding
Inventor
E. F. Siebert,
Attorney

UNITED STATES PATENT OFFICE.

EMIL F. SIEBERT, OF MERIDAN, SASKATCHEWAN, CANADA.

COFFEE-POT.

1,115,872.  Specification of Letters Patent.  Patented Nov. 3, 1914.

Application filed June 5, 1913. Serial No. 771,915.

*To all whom it may concern:*

Be it known that I, EMIL FREDERICK SIEBERT, a subject of the King of England, residing at Meridan P. O., in the Province of Saskatchewan, Dominion of Canada, have invented certain new and useful Improvements in Coffee-Pots; and I do hereby declare the following to be a full, clear, and exact description of the invention, such as will enable others skilled in the art to which it appertains to make and use the same.

The present invention is directed to improvements in coffee pots and has for its object to so construct an article of this type that the coffee may be placed in a receptacle and supported within the pot so as to absorb the strength from the coffee, and at the same time eliminating the necessity of boiling the coffee.

A further object of the invention is to provide a coffee pot so constructed that when coffee is poured therefrom it will be filtered and in a clear state.

With these and other objects in view, this invention resides in the novel features of construction, formation, combination and arrangement of parts to be hereinafter more fully described, claimed and illustrated in the accompanying drawing, in which:

Figure 1 is a vertical sectional view through the pot. Fig. 2 is a sectional view on line 2—2 of Fig. 1. Fig. 3 is a detail perspective view of the coffee receptacle. Fig. 4 is a fragmentary view showing the fastening means for the funnel member.

Referring to the drawing, the numeral 1 designates the body of the pot, the upper end of which is provided with a vertical flange 2, said flange being provided with an interior groove 3 having communicating therewith vertical grooves 4 which receive the lugs 5 formed at diametrically opposite points upon the outer surface of the flange 6 of the funnel member 7 so that the same are guided to the groove 3, whereupon partially rotating the member 7 the same is securely held in place.

To facilitate the rotation of the funnel member 7 the neck 8 thereof is provided near its upper end with oppositely disposed perforations 9 in which are secured the lower ends of the handle 10, said handle also serving to aid in the removal of the funnel member from the upper end of the pot. The lower end of the neck 8 is interiorly threaded, as at 11 for receiving the threaded end of the tubular section 12 which is likewise connected to a similar section 13, the lower end of which is in threaded engagement with the upper end of the tube 14, said tube having its lower end fitted in the socket 15 formed centrally of the bottom of the pot. The neck 8 is provided with interior vertical grooves 16 which are intersected by annular grooves 17, the section 12 being also provided with vertical grooves 17' and annular intersecting grooves 18, the grooves 17 being in line with the grooves 16 of the neck 8. The section 13 is likewise provided with a groove 19 which is intersected by an annular groove 20. The groove 19 is in line with the vertical groove 21 formed in the upper end of the tube 14, said groove opening into the annular groove 22. It will be of course understood that the vertical grooves 16, 17', 19 and 21 are formed at diametrically opposite points, the purpose of which will appear later.

The coffee receptacle consists of a cylindrical body 23 the bottom of which is provided with a wire mesh screen 24, said body having an annular groove 25 formed near its upper edge, and oppositely disposed vertical grooves 26 having communication therewith for receiving the lugs 27 carried upon the opposite side of the top 28, said top being provided with a handle 29 which when grasped and turned will cause the lugs 27 to engage the groove 25, thus preventing accidental removal of the top. The top is provided with a wire mesh screen 29 so that boiling water may pass through the body 1 when in use.

The body 1 is provided upon opposite sides with lugs 30 which are adapted to engage the vertical grooves 16 formed in the neck 8 of the funnel member and are moved downwardly therein until one of the grooves 17' is reached whereupon partial rotation of the body 1, the lugs will engage one of the annular grooves 17 thus supporting the coffee receptacle in the neck 8, and at which time the capacity of the pot will, for instance, be eight cups. Should it be desired to make only six cups of coffee the funnel member 7 is removed from the pot thus carrying the connected sections 12 and 13, and tube 14. It is then only necessary to disconnect the neck 8 from the section 12 and to place the coffee receptacle in the section 12 which is then again connected to the neck 8 and placed within the pot. It is obvious that the same operation is necessary to make four cups of coffee, that is to say that the coffee receptacle is then placed in the receptacle 13. Should it only be desired to make two cups of coffee the same mode of operation is resorted to and the coffee receptacle placed in the tube 14. It will be of course understood that the grooves in the sections 12, 13 and tube 14 serve to support the receptacle when the lugs 30 thereof engage the proper groove. The neck 8, and sections 12 and 13 are provided with perforations 31, 32 and 33, respectively, perforations 34 being likewise provided for the tube 14.

From this construction it will be seen that when the coffee receptacle is placed to make the required amount of coffee, boiling water is poured into the funnel member 7, and will pass through the ground coffee into the receptacle as is the usual practice in making as is known "drip coffee." To retain the heat within the pot 1 a cover 35 is provided, and has its flange 36 fitted in the upper end of said funnel member. When the pot is being used at its capacity it is only necessary that the handle 10 be removed from the neck 8 of the funnel member, this being readily accomplished due to the fact that the handle 10 is formed from resilient wire and may be easily sprung from engagement with the perforations 9. Further, if the pot is being used at its capacity the coffee receptacle is placed in the neck 8, and the section 12, section 13 and tube 14 may be removed if desired. When making, for instance, six cups, the neck and section 12 are connected and the receptacle placed in the latter, and at which time it is not necessary to use section 13 and tube 14. To make four cups of coffee the receptacle is placed in section 13 and the tube 14 removed. It is of course obvious that the tube 14 need not be used, when using the pot for making more than two cups of coffee, it being only necessary to use the same when two or less cups are desired, and at which time the neck and connected sections will direct the hot water to the receptacle supported in the tube.

From the foregoing description it will be seen that a coffee pot has been provided with novel means for supporting the coffee receptacle so that drip coffee may be made. It will be of course understood that tea may be placed in the receptacle, the operation being the same. It is apparent that a water gage, of any well known construction can be connected to the pot so that the amount of water can be readily determined.

What is claimed is:—

1. A coffee pot having a funnel member mounted in its upper end, a plurality of detachably connected sections, the uppermost section being detachably connected to the neck of the funnel member, a tube connected to the lowermost section, a coffee receptacle removably mounted in either of the sections, or the tube.

2. A coffee pot having a funnel member removably mounted in its upper end, the neck of said funnel member being provided with vertical and annular grooves, detachably connected sections carried by the neck of the funnel member, vertical and annular grooves formed in each of the sections, the vertical grooves of each section being in alinement with each other and the similar grooves of said neck, a tube having its lower end resting in a socket formed in the bottom of the pot, and its upper end connected to the lowermost section, said tube having vertical grooves formed in its upper end, said grooves opening into an annular groove carried by the tube, a coffee receptacle having lugs formed upon its sides adapted to detachably engage the annular grooves formed in the neck of the funnel member, sections and tube after the lugs have passed through the vertical grooves formed in said parts, as and for the purpose set forth.

In testimony whereof, I affix my signature, in the presence of two witnesses.

EMIL F. SIEBERT.

Witnesses:
WARREN M. ELLIOTT,
JAMES D. MURPHY.